United States Patent [19]

Tomko et al.

[11] Patent Number: 5,128,086
[45] Date of Patent: Jul. 7, 1992

[54] EPOXY-MODIFIED ENCAPSULATION COMPOSITION

[75] Inventors: Richard F. Tomko; Revati Ranganathan, both of Homewood, Ill.; William D. Sigworth, Naugatuck, Conn.; Dong-Hak Bae, The Woodlands, Tex.

[73] Assignee: Uniroyal Chemical Company, Inc., Middlebury, Conn.

[21] Appl. No.: 232,420

[22] Filed: Aug. 15, 1988

Related U.S. Application Data

[60] Division of Ser. No. 58,000, Jun. 4, 1987, Pat. No. 4,787,703, Continuation-in-part of Ser. No. 787,870, Oct. 16, 1985, abandoned.

[51] Int. Cl.$^5$ .............................................. B29C 39/10
[52] U.S. Cl. ........................... 264/272.11; 264/272.13; 264/279; 156/48
[58] Field of Search .............. 264/279, 222.11, 272.13; 156/48

[56] References Cited

U.S. PATENT DOCUMENTS

| | | | |
|---|---|---|---|
| 3,150,221 | 9/1964 | Bollmeier | 264/279 X |
| 3,448,174 | 6/1969 | Loveless et al. | 260/878 |
| 3,974,132 | 8/1976 | Valiserri | 526/20 |
| 4,217,028 | 8/1980 | Reh et al. | 350/96.20 |
| 4,222,801 | 9/1980 | Gold | 156/49 |
| 4,245,061 | 1/1981 | Tachi et al. | 525/286 |
| 4,259,540 | 3/1981 | Sabia | 174/23 |
| 4,388,202 | 6/1983 | Nagano et al. | 252/52 A |
| 4,701,015 | 10/1987 | Saito et al. | 350/96.23 |
| 4,703,997 | 11/1987 | Ijiri et al. | 350/96.23 |
| 4,787,703 | 11/1988 | Tomko et al. | 350/96.23 |

Primary Examiner—Robert A. Dawson
Assistant Examiner—Allan R. Kuhns
Attorney, Agent, or Firm—Glenn E. Karta

[57] ABSTRACT

Epoxy-grafted, low molecular weight amorphous polymer compositions are employed in pourable, liquid telecommunication cable encapsulation compositions. Also disclosed is a method for encapsulating telecommunication cables as well as cables encapsulated with such an epoxy-grafted liquid encapsulant.

9 Claims, No Drawings

EPOXY-MODIFIED ENCAPSULATION COMPOSITION

CROSS REFERENCE TO RELATED APPLICATIONS

This application is a divisional of application Ser. No. 07/058,000 filed Jun. 4, 1987, now U.S. Pat. No. 4,787,703, which in turn is a continuation-in-part of application Ser. No. 06/787,870 filed Oct. 16, 1985, now abandoned.

FIELD OF THE INVENTION

This invention is directed to a pourable liquid encapsulation composition for telecommunication cables which is comprised of (a) an amorphous low molecular weight epoxy-grafted polymer having a backbone selected from the group consisting of polyalphaolefin, ethylene/alphaolefin copolymer, ethylene/alphaolefin/non-conjugated polyene terpolymer, polyisoprene, polybutadiene and alphaolefin/polyene copolymer; and (b) a curative therefore. In other aspects, this invention is directed to novel graft polymers which may be employed in the composition of this invention; to a method of encapsulating telecommunication cables employing such encapsulation composition; and to a telecommunication cable encapsulated with such encapsulant composition.

BACKGROUND OF THE INVENTION

Telecommunication cables, whether of the metallic or fiber optic variety, are frequently employed in situations wherein water can enter and migrate through the cable system. Water entry into either copper or fiber optic cables is undesirable because it leads to deterioration of transmission properties due to corrosion, particularly at the sites where cables are spliced together. In order to protect the cable system, it has become known to encase certain segments of the cable in a closure which acts as an extension of the cable sheath or cover. In addition, it has become known to encapsulate the enclosed segment with a curable encapsulant so as to prevent water migration into the segment.

Examples of cable segments which are typically placed in closures and encapsulated are the area where two or more cables are spliced together (i.e., a splice), the end of the cable (i.e., an end block), and the junction between an air pressurized cable and a hydrocarbon grease filled cable (i.e., pressure block).

In addition to preventing water migration into the telecommunication cable splice, it is often desirable for the encapsulant to be re-enterable. Re-enterable means that upon opening a closure containing a cured encapsulant, the encapsulant can be entirely removed from the splice area by hand (using no tools in the area around the copper wires or fiber optic filaments) without damaging the individual wire or filament connections and without removing any of the insulation on the copper wires or any of the coating on the fiber optic filaments. Since the splice closure is encapsulated at on-site locations in the field where the cable is being layed, the encapsulant must also be capable of being poured as well as cured over a wide range of ambient temperatures (35°-100° F.).

Among the materials exhibiting insulation and thermal resistance properties which are desirable for encapsulation purposes are terpolymers of ethylene, propylene and a nonconjugated diene (i.e., "EPDM"). Thus, U.S. Pat. No. 3,974,132 to Valdiserri discloses the insulation and coating of electrically conducting wire with EPDM which is crosslinked with a trialkyl phosphate. However, several disadvantages are associated with the use of EPDM polymers such as those disclosed in this patent.

Primary among these disadvantages is that the EPDM employed in the Valdiserri and other similar processes is a high molecular weight material which must be pelletized. Consequently, in order to adapt the embedding composition to the configuration of the circuitry to be protected, such pelletized EPDM must be simultaneously subjected to heat and pressure. Such pressure and temperature requirements prohibit the accomplishment of on-site encapsulation of telecommunication cables, e.g., for the protection of splices or other on-site repairs.

U.S. Pat. No. 3,448,174, issued to Loveless, shows low molecular weight epoxy-modified ethylene/propylene/dicyclopentadiene terpolymers wherein the pendent dicyclopentadiene group itself is epoxy modified, and discloses that such compounds are useful as casting and coating compositions.

Tachi et al, in U.S. Pat. No. 4,245,061, disclose epoxy-modified waxes having a number average molecular weight of between 600 and 10,000. Such waxes are blended with a thermosetting resin to form compositions which are useful as paints, adhesives or molding materials.

U.S. Pat. No. 4,388,202, issued to Nagano et al, discloses lubricating oil compositions which comprise uncured epoxy-grafted polymers having saturated backbones and number average molecular weights ranging from about 5,000 to about 100,000.

However, none of the above-discussed patents disclose an encapsulation composition for telecommunication cables which may be readily applied and cured at or near ambient temperatures and pressures, which would not endanger the wires or filaments to be protected and which is amenable to on-site application to protect splices and the like.

Accordingly, it is an object of this invention to provide a pourable liquid encapsulation composition which may be cured at ambient or slightly elevated temperatures and pressures, and which may therefore be employed to protect metallic and/or fiber optic telecommunication cables.

It is further object of this invention to provide an encapsulation composition which may be employed for on-site applications.

It is yet another object of this invention to provide a method of encapsulating telecommunications cables employing such composition.

It is yet another object of this invention to provide an epoxy-grafted polymer which may be employed in the composition of this invention.

It is yet a further object of this invention to provide a telecommunications cable segment encapsulated with such an encapsulant composition.

The above objects and additional objects will become more fully apparent from the following description and accompanying Examples.

DESCRIPTION OF THE INVENTION

In one aspect, this invention relates to a pourable, liquid composition comprising:

(A) a liquid graft polymer having a Brookfield viscosity of less than about 1,000,000 centipoise at 25° C., which graft polymer either possesses no melting transition peak or possesses a melting transition peak having a maximum value below 25° C. as measured by Differential Scanning Calorimetry;

said graft polymer being comprised of: a polymeric backbone selected from the group consisting of polyalphaolefin, ethylene/alphaolefin copolymer, ethylene/alphaolefin/nonconjugated polyene terpolymer, polyisoprene, polybutadiene, and alphaolefin/polyene copolymer;

said polymeric backbone having grafted thereto a sufficient amount of at least one compound selected from the formulae:

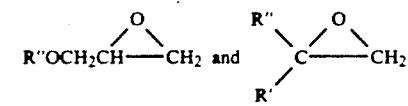

wherein R" is a $C_2-C_{16}$ hydrocarbon radical containing an ethylenically unsaturated bond or a $C_3-C_{12}$ radical containing one or more carbonyl groups and an ethylenically unsaturated double bond; and R' is hydrogen or $C_1-C_4$ alkyl;

such that said graft polymer is rendered crosslinkable;

said graft polymer having a number average molecular weight of between about 500 and about 20,000; and (B) a sufficient amount of a suitable curative to cure the composition.

In another aspect, this invention is directed to:

(A) a liquid graft polymer having a Brookfield viscosity of less than about 1,000,000 centipoise at 25° C., said graft polymer either possessing no melting transition peak or possessing a melting transition peak having a maximum value below 25° C. as measured by Differential Scanning Calorimetry;

said graft polymer being comprised of: a polymeric backbone selected from the group consisting of polyalphaolefin, ethylene/alphaolefin copolymer, ethylene/alphaolefin/nonconjugated polyene terpolymer, polyisoprene, polybutadiene, and alphaolefin/polyene copolymer;

said polymeric backbone having grafted thereto a sufficient amount of at least one compound selected from the formulae:

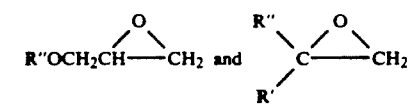

wherein R" is a $C_2-C_{16}$ hydrocarbon radical containing an ethylenically unsaturated bond or a $C_3-C_{12}$ radical containing one or more carbonyl groups and an ethylenically unsaturated double bond; and R' is hydrogen or $C_1-C_4$ alkyl;

such that said graft polymer is rendered crosslinkable; said graft polymer having a number average molecular weight of between about 500 and about 4,500.

In yet another aspect, this invention relates to a method of encapsulating a telecommunication cable segment comprising the steps:

(A) placing a telecommunications cable segment within a closure;

(B) forming an encapsulation composition by mixing:

(1) a liquid graft polymer having a Brookfield viscosity of less than about 1,000,000 centipoise at 25° C.;

said graft copolymer either possessing no melting transition peak or possessing a melting transition peak having a maximum value below 25° C. as measured by Differential Scanning Calorimetry;

said graft polymer being comprised of: a polymeric backbone selected from the group consisting of polyalphaolefin, ethylene/alphaolefin copolymer, ethylene/alphaolefin/nonconjugated polyene terpolymer, polyisoprene, polybutadiene, and alphaolefin/polyene copolymers;

said polymeric backbone having grafted thereto a sufficient amount of at least one compound selected from the formulae:

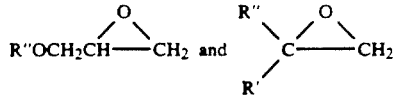

wherein R" is a $C_2-C_{16}$ hydrocarbon radical containing an ethylenically unsaturated bond or a $C_3-C_{12}$ radical containing one or more carbonyl groups and an ethylenically unsaturated double bond; and R' is hydrogen or $C_1-C_4$ alkyl;

such that said graft polymer is rendered crosslinkable; said graft polymer having a number average molecular weight of between about 500 and about 20,000; with (2) a sufficient amount of a suitable curative to cure the composition;

(C) pouring a sufficient amount of said encapsulation composition into the closure such that the portion of said telecommunication cable segment to be embedded is covered with said encapsulation composition; and (D) subjecting said encapsulation composition to curing conditions.

In yet another aspect, this invention relates to a telecommunication cable segment having at least a portion thereof coated with a pourable liquid composition comprising:

(A) a liquid graft-polymer having a Brookfield viscosity of less than about 1,000,000 centipoise at 25° C., said graft polymer either possessing no melting transition peak or possessing a melting transition peak having a maximum value of below 25° C. as measured by Differential Scanning Calorimetry;

said graft polymer being comprised of: a polymeric backbone selected from the group consisting of polyalphaolefin, ethylene/alphaolefin copolymer, ethylene/alphaolefin/nonconjugated polyene terpolymer, polyisoprene, polybutadiene, and alphaolefin/polyene copolymer;

said polymeric backbone having grafted thereto a sufficient amount of at least one compound selected from the formulae:

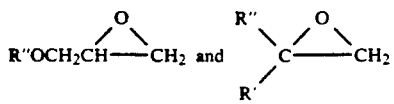

wherein R" is a $C_2$-$C_{16}$ hydrocarbon radical containing an ethylenically unsaturated bond or a $C_3$-$C_{12}$ radical containing one or more carbonyl groups and an ethylenically unsaturated double bond; and R' is hydrogen or $C_1$-$C_4$ alkyl; such that said graft polymer is rendered cross-linkable;

said graft polymer having a number average molecular weight of between about 500 and about 20,000; and (B) a sufficient amount of a suitable curative to cure the composition.

The encapsulation composition of this invention is comprised of (1) a graft polymer and (2) a curative. Such graft polymers comprise a polymeric backbone having an epoxy-functional compound grafted thereto.

The polymeric backbone of the graft polymer of the composition of this invention is selected from the group consisting of polyalphaolefin, ethylene/alphaolefin copolymer, ethylene/alphaolefin/nonconjugated polyene terpolymer, polyisoprene, polybutadiene, and alphaolefin/polyene copolymer. Preferably, such backbone is composed of a polyalphaolefin, ethylene/alphaolefin copolymer or ethylene/alphaolefin/nonconjugated polyene terpolymer. Particularly preferred backbones include ethylene/propylene copolymer, and ethylene/propylene/non-conjugated diene terpolymer (EPDM).

The polyalphaolefin, polyisoprene and polybutadiene polymers that may be employed may be homopolymers of these monomers or copolymers additionally comprising a minor amount of another monomer or monomers exhibiting vinyl unsaturation such as styrene, acrylate, methacrylate, acrylonitrile, methacrylonitrile and the like, provided that the presence of such other monomers does not detrimentally affect the characteristics of the grafted polymers. Moreover, the polyisoprene and polybutadiene polymers may be unhydrogenated, partially hydrogenated or fully hydrogenated.

The polyalphaolefin polymers that may form the backbone of the graft polymers of this invention are homo- or copolymers of one or more alphaolefins having the formula $H_2C=CHR$ wherein R is a linear or branched alkyl radial containing from 1 to 10 carbon atoms. Preferably, R is $C_1$-$C_8$ alkyl. The most preferred alphaolefins are propylene, 1-butene, 1-hexene and 1-decene.

The ethylene/alphaolefin copolymers which may be employed in the practice of this invention are copolymers of ethylene and at least one alphaolefin having the formula $H_2C=CHR$ wherein R is a linear or branched alkyl radial containing from 1 to 10 carbon atoms. Preferably, R is $C_1$-$C_8$ alkyl. The most preferred alphaolefins are propylene, 1-butene and 1-hexene.

The ethylene/alphaolefin/nonconjugated polyene terpolymers which may be employed are polymers of ethylene, at least one alphaolefin (of the formula $H_2C=CHR$, wherein R is a linear or branched alkyl radical comprised of from 1 to 10 carbon atoms) and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,7-octadiene, 1,9-decadiene, exo-and endo- dicyclopentadiene and the like; exo- and endo- alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylideneorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/alphaolefin copolymers and ethylene/alphaolefin/nonconjugated polyene terpolymers that may be employed is generally between about 25% and about 85%, is preferably between about 30% and about 75%, and is most preferably between about 40% and about 70%, all by weight. The polyene content of such terpolymers is generally below about 25%, and is preferably between about 2 and about 20%, all by weight.

The alphaolefin/polyene copolymers which may form the backbone of the polymers employed in the encapsulation composition of this invention are copolymers of at least one alphaolefin having the formula $H_2C=CHR$, wherein R is a linear or branched alkyl radial containing from 1 to 10 carbon atoms, and at least one conjugated or nonconjugated polyene.

Particularly preferred polymer backbones for the graft polymers employed in the composition of this invention are low molecular weight copolymers of ethylene, an alphaolefin and (optionally) a nonconjugated polyene, which copolymers have a viscosity index of at least about 75 and vinylidene-type unsaturation. These copolymers are described in U.S. Pat. No. 4,668,834 and are readily prepared employing metallocene catalysts such as $(C_5H_5)_2Zr(CH_3)_2$, $(C_5H_5)_2Ti(CH_3)_2$, $(C_5H_5)_2ZrCl_2$, $(C_5H_5)_2TiCl_2$ and the like, in combination with linear or cyclic aluminoxane cocatalysts, such as methaluminoxane.

The polymeric backbones have grafted thereto a sufficient amount of a compound having epoxy functionality such that such graft polymers are rendered crosslinkable and such that the said graft polymers are essentially amorphous liquids at room temperature. As employed in the instant specification, an amorphous liquid polymer is defined as a polymer (1) having a Brookfield viscosity of less than about 1,000,000 centipoise at 25° C.; and (2) either having no crystalline melting point or a crystalline melting point with a maximum value below 25° C. as measured by Differential Scanning Calorimetry. In general, such epoxy groups will comprise between about 1 and about 20, preferably between about 1 and about 12, more preferably between about 1.5 and about 10, and most preferably between about 2.5 and about 7 weight percent of the graft polymer. Preferably, the epoxy functionality is present in amounts of between about 1 and about 10 groups per polymer chain. More preferably between about 1.5 and about 6, and most preferably between about 2 and about 4.5 epoxy groups per polymer chain are present.

The epoxy-functional compounds which may be grafted to the polymeric backbone are of the formulae:

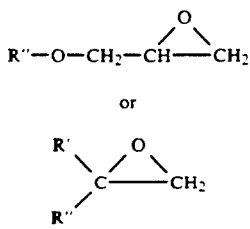

wherein R" is a $C_2$-$C_{16}$ hydrocarbon radical containing an ethylenically unsaturated bond or a $C_3$-$C_{12}$ radical containing one or more carbonyl groups and an ethylenically unsaturated double bond; and R' is hydrogen or $C_1$-$C_4$ alkyl. Preferably, R is a $C_2$-$C_{12}$ hydrocarbon group containing an ethylenically unsaturated bond or is an acrylate or a methacrylate group.

Illustrative of the epoxy functionalized compounds which may be employed are allyl glycidyl ether, 2-methylallyl glycidyl ether, o-allylphenyl glycidyl ether, m-allylphenyl glycidyl ether, p-allylphenyl glycidyl ether, isopropenylphenyl glycidyl ether, o-vinylphenyl glycidyl ether, m-vinylphenyl glycidyl ether and p-vinylphenyl glycidyl ether; 2-(o-vinylphenyl)ethylene oxide, 2-(o-vinylphenyl)propylene oxide, 2-(p-vinylphenyl)propylene oxide, 2-(o-allylphenyl)ethylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-hexene, 1,2-epoxy-7-octene, vinylcyclohexene monoxide and allyl-2,3-epoxycyclopentyl ether, glycidyl acrylate, and glycidyl methacrylate. Preferred epoxy compounds are allyl glycidyl ether, 2-methallyl glycidyl ether, isopropenylphenyl glycidyl ether, allylphenyl glycidyl ether and 2-(allylphenyl)ethylene oxide.

The graft polymers which may be employed generally possess a number average molecular weight of between about 500 and about 20,000, preferably of between about 750 and about 10,000, and most preferably of between about 1,000 and about 4,500. Such graft copolymers are novel compounds when they possess a number average molecular weight of below about 4,500.

Moreover, the graft polymers employed in this invention possess a glass transition temperature of less than about 25° C., preferably of less than about −20° C., most preferably of less than about −35° C. Such graft polymers are essentially amorphous liquids that are readily pourable at room or slightly elevated temperature, having a Brookfield viscosity of less than about 1,000,000 centipoise, preferably of less than about 500,000 centipoise, at 25° C. The graft-polymers of this invention are essentially amorphous in that they do not possess a melting transition peak or possess a melting transition peak with a maximum value below 25° C., preferably of below 20° C. and most preferably of below 10° C., as measured by Differential Scanning Calorimetry.

The graft polymers employed in the practice of this invention may be prepared by contacting the polymeric backbone with an epoxy-functional compound at between about 50° and about 200° C., in the presence of a free radical generator such as organic hydroperoxides or peroxides, or an azonitrile. The free radical generator is generally employed in amounts between about 0.05 and about 30, preferably between about 0.4 and about 30 percent by weight, based upon the weight of the polymeric material.

Free radical generators which may be employed in carrying out the graft reaction include aromatic or aliphatic (hydro)peroxides, including aromatic diacyl peroxides and aliphatic diacyl peroxides, diabasic acid peroxides, ketone peroxides, alkyl peroxyesters and alkyl hydroperoxides. Illustrative of the (hydro)peroxides which may be employed are diacetylperoxide, dibenzoylperoxide, bis-2,4-dichlorobenzoyl peroxide, ditert-butyl peroxide, dicumylperoxide, tert.-butylperbenzoate, tert.-butylcumyl peroxide, 2,5-bis(tert.-butylperoxy)2,5-dimethylhexane, 2,5-bis-(tert.-butylperoxy-2,5-dimethylhexyne-3,4,4,4',4'-tetra-(tert.-butylperoxyl)-2,2dicycloxylpropane, 1,4-bis-(tert.-butyl-peroxy-isopropyl)-benzene, 1,1-bis-(tert.-butylperoxy)-3,3,5-trimethylcyclohexane, lauroyl peroxide, succinic acid peroxide, cyclohexanone peroxide, tert.-butyl peracetate, butyl hydroperoxide, and the like.

Free radical generators which are also suitable include azide-type compounds such as azidoformates, for example tetramethylenebis(azidoformate) and the like; aromatic polyazides such as 4,4'-diphenylmethane diazide and the like; and sulfonazides such as p,p'-oxybis (benzenesulfonyl azide) and the like. Particularly preferred free radical generators include di-t-butyl peroxide and dicumyl peroxide.

The curative employed in the composition of this invention may comprise any compound which cure epoxy groups. Preferably, such curative will be effective at ambient temperatures. Illustrative of curatives which may be employed are linear aliphatic polyamines such as diethylene triamine, triethylene tetramine, tetraethylene pentamine, dipropylenediamine and diethylaminopropylamine and the like; cyclic aliphatic polyamines; aliphatic polyamine adducts; ketimines; modified aliphatic amines; aromatic amines; aromatic modified amines; tertiary amine-type curing agents; mercapto-type curing agents; acid anhydride-type curing agents; Lewis Acid type curing agents such as $BF_3$ and $SnCl_4$ complexes; copolymers containing an acid anhydride group such as ethylene/maleic anhydride copolymers; compounds containing a phenolic hydroxyl group such as precondensates of phenolic resins; and other curing compounds such as dicyandiamide and melamine.

The amount of curative which may be employed will vary in accordance with a number of factors, including the particular curative selected, the degree of epoxidation present of the graft polymers, the degree of cure desired, and the like. However, one skilled in the art may be routine experimentation determine the optimum levels of curative for a given encapsulation composition.

The compositions of this invention may further comprise cure accelerators in order to decrease their gelling or setting time. Any of the known epoxy-cure accelerators may be employed, provided that the protection afforded by the encapsulant is not adversely affected. Preferred accelerators include alkylphenols such as nonylphenol, dodecylphenol, and the like. The preferred amounts of accelerators will depend on a variety of factors, including the curative employed, the amount of epoxy-functionality present, the amount of curative employed, and the like. However, one of ordinary skill in the art may readily determine the optimum amount of accelerator to be employed in a given encapsulation composition by routine experimentation.

Moreover, the encapsulation compositions of this invention may additionally comprise (preferably minor) amounts of diluents in order to increase their pourability. Such diluents may be reactive or nonreactive. Particularly preferred diluents include alkyl glycidyl ethers, which will react with the curative and which, consequentially, cannot be leached out as well as other epoxy-functionalized reactive compounds which will increase the pourability of the composition.

The telecommunication cable segments which may be encapsulated with the encapsulation composition of this invention may be of the metallic or of the fiber optic type. Because of its pourability and curability at ambient or slightly raised temperature, the compositions of this invention are admirably suited for the on-site encapsulation of cable segments such as splices, pressure blocks and end blocks.

The method of this invention is typically performed as follows. A telecommunication cable segment is placed within a closure. Such closure serves to act (in part) as a retainer for the liquid encapsulation composition. Accordingly, said closure may generally be of any useful configuration or composed of any useful material, although in certain instances a particular configuration and/or material may be preferred. The liquid encapsulation composition of this invention is typically then prepared by mixing the graft polymer with the curative. Said mixing may be accomplished by any means effective to adequately disperse the curative within the graft polymer such that curing will occur.

The mixted encapsulation composition is poured into the closure such that said composition covers at least that portion of the cable segment to be protected. Such pouring is preferably accomplished at ambient temperatures, although slightly elevated temperatures (typically up to about 65° C.) may be employed. It is to be understood that such pouring may be accomplished at any temperature below the decomposition temperature of the encapsulation composition which will not cause damage to the cable segment to be protected.

The encapsulation composition is then subjected to curing conditions. In the preferred embodiments of this invention, curing conditions generally comprise ambient temperature and pressure.

The encapsulation compositions of this invention are easily adaptable for on-site repairs due to their ease of application and exhibit excellent adhesion to wire. Moreover, because these compositions will, in general, cure at ambient temperatures and pressures, the telecommunication cable to be protected is not subjected to thermal or pressure shocks while being encapsulated. Telecommunication cable segments protected by the encapsulation composition of this invention will be less vulnerable to damage resulting from water entry.

Compared with the polyurethane gels based on hydroxy terminated polybutadiene currently used to encapsulate splices in the telecommunication industry, the encapsulation compositions of this invention generally provide better moisture resistance due to the higher hydrolytic stability of epoxide crosslinks vis-a-vis urethane linkages; improved compatibility with hydrocarbon based compounds used to fill telecommunication cables; and improved adhesion to polyethylene insulated conductor wires which are coated with the cable filling compound.

These advantages act together to increase the durability and to reduce the maintenance costs of telecommunication cable splices, particularly those splices which are buried underground. Urethane encapsulants' poor compatibility with cable filler and poor conductor wire adhesion allows water which enters the cable system to travel through the splice to the wire contacts where corrosion may cause a splice failure. The improved compatibility with cable filler and improved conductor wire adhesion of the encapsulant compositions of this invention will prevent or greatly reduce the frequency of such warer corrosion related failures caused by such water entry.

EXAMPLES

The following Examples are intended to further illustrate the invention are not intended to limit the scope of the invention in any manner whatsoever.

EXAMPLES 1-9

To a dry 3-liter glass resin flask equipped with a mechanical stirrer, thermometer, distilling head, heating mantle and nitrogen inlet tube were added 935 grams liquid ethylene-propylene copolymer (having a number average molecular weight of 2,200 and an ethylene/propylene (E/P) molar ratio of 60:40) and a mixture of 50.6 grams di-t-butyl peroxide in 234 grams of allyl glycidyl ether at room temperature. The reactor was flushed with dry nitrogen during such addition. The nitrogen was shut off and the reactor heated to 150° C. during which time the reaction mixture was stirred. As the reaction was proceeding, acetone and t-butanol (the decomposition products of the peroxide) were removed by distillation. The reaction was carried out for 4 hours after which time the reaction mixture was vacuum stripped at 150° C. and at about 260 Pa pressure for one hour. The modified polymer product was then removed from the reactor. The results of an analysis of the graft polymer so prepared is listed in Table I below as Example 1.

Following a similiar procedure to that described in Example 1, several additional epoxy-grafted ethylene/propylene copolymers (Examples 2-9) were prepared. The backbone polymers, graft initiators and the results of analyses performed on the resultant graft copolymers are summarized in Table 1.

TABLE I

| | Epoxy-Grafted Ethylene/Propylene Copolymers | | | | | | | | |
|---|---|---|---|---|---|---|---|---|---|
| EXAMPLE | 1 | 2 | 3 | 4 | 5 | 6 | 7 | 8 | 9 |
| Backbone Polymer | | | | | | | | | |
| Catalyst | Zr[1] | Zr | V[2] | V | Zr | Zr | V | Zr | V |
| Ethylene/Propylene (molar ratio) | 60/40 | 49/51 | 61/39 | 61/39 | 60/40 | 48/52 | 61/39 | 60/40 | 61/39 |
| Molecular Weight (number average) | 2200 | 1330 | 2500 | 2500 | 2200 | 1860 | 2500 | 2200 | 2500 |
| Initiator | | | | | | | | | |
| Type | t-Bu[3] | Dicup[4] | Dicup | Dicup | Dicup | t-Bu | Dicup | t-Bu | t-Bu |
| Parts/100 Parts Backbone Polymer | 5.4 | 20 | 16.6 | 10 | 5.4 + 5.4[5] | 5.4 | 9.2 | 5.4 | 5 |

TABLE I-continued

| | Epoxy-Grafted Ethylene/Propylene Copolymers | | | | | | | | |
|---|---|---|---|---|---|---|---|---|---|
| EXAMPLE | 1 | 2 | 3 | 4 | 5 | 6 | 7 | 8 | 9 |
| Modified Polymer | | | | | | | | | |
| Allyl Glycidyl Ether (Parts)(AGE) | 25 | 30 | 38 | 25 | 25 + 25[5] | 25 | 10 | 25 | 20 |
| Epoxy Groups (weight percent) | 4.5 | 9.7 | 5.0 | 5.2 | 5.9 | 4.4 | 2.9 | 4.3 | 1.4 |
| Molecular Weight (number average) | 2610 | 1310 | 2850 | 3040 | 2690 | 1990 | 3730 | 2190 | 3210 |
| Epoxy/Chain | 2.8 | 3.0 | 3.3 | 3.7 | 3.7 | 2.1 | 2.5 | 2.2 | 1.0 |
| Brookfield Viscosity (cps)/1000 at 25° C. | 34.5 | —[6] | 470 | 670 | 244 | 29.4 | 590 | 40.8 | 123 |

[1]Zr: $(C_5H_5)_2ZrCl_2$ catalyzed
[2]V: $VOCl_3$ catalyzed
[3]t-Bu: di-tertbutyl peroxide
[4]Dicup: dicumyl peroxide
[5]Reaction run first on unfunctionalized EP using 25 phr AGE and 5.4 phr Di-t-butyl peroxide. Epoxidized EP was then reacted again with 25 phr AGE and 5.4 phr Di-t-butylperoxide.
[6]"—": Indicates not measured Formulations of the above graft polymers were prepared in accordance with one of the following seven recipes:

| Recipe | (a) | (b) | (c) | (d) | (e) | (f) | (g) |
|---|---|---|---|---|---|---|---|
| Graft Polymer | 100 | 100 | 100 | 100 | 100 | 100 | 100 |
| $C_{12}$-$C_{14}$ alkyl glycidyl ether | 23 | 50 | 65 | 30 | 50 | 50 | — |
| Nonylphenol | 10 | 50 | 50 | 50 | 50 | 50 | — |
| Triethylenetetramine | 7.8 | 7.6 | 8.1 | 6.0 | 7.2 | 6.3 | 3.4 |

Twenty-five grams of each of the above encapsulation compositions were poured into an aluminum dish heated to 53° C. (127° F.). A glass rod was frequently dipped into the encapsulation composition mixture until the polymer had a tendency to snap back. The time from mixing to snap-back condition is considered the gel time (in minutes). The recipes of each composition prepared and the physical properties of the cured compositions are listed in Table III (below).

TABLE II

| | Epoxy-Grafted Ethylene/Propylene Copolymers | | | | | | | | |
|---|---|---|---|---|---|---|---|---|---|
| EXAMPLE | 1 | 2 | 3 | 4 | 5 | 6 | 7 | 8 | 9 |
| Recipe | (d) | (a) | (e) | (b) | (c) | (d) | (f) | (d) | (g) |
| Gel Time @ 53° C.(min) | 25 | <20 | 7 | 13 | 10 | 19 | 21 | 28 | 73 |
| Shore A | 6 | — | 13 | 9 | 18 | 6 | 1 | 7 | 6 |
| Percent Elongation at Break | 50–100 | <50 | 50–100 | 50 | 40 | 50–100 | 150 | 50–75 | 100 |
| Days Cure @ Temp. | 5 / 26° C. | 0.7 / 53° C. | 0.7 / 53° C. | 5 / 24° C. | 5 / 24° C. | 10 / 24° C. | 0.7 / 53° C. | 0.7 / 53° C. | 3 / 53° C. |

The above results indicate the short gel time and low temperature curability of the encapsulation compositions of this invention, thus demonstrating their utility for the on-site encapsulation of telecommunication cable segments.

EXAMPLES 10-11

Following a procedure essentially identical to that described in Example 1, several ethylene/propylene/dicyclopentadiene terpolymers, each comprising 5 molar percent dicyclopentadiene, were grafted with allyl glycidyl ether. Formulations of these polymers were perpared (as described in Example 1 above) and analyses of the cured compositions performed. The graft polymers produced, along with the results of such analyses, are summarized in Table III.

TABLE III

| | EPOXY-GRAFTED EPDM | |
|---|---|---|
| Example | 10 | 11 |
| Backbone Polymer | | |
| Catalyst | $VOCl_3$ | $VOCl_3$ |
| Ethylene/Propylene molar ratio | 57/43 | 57/43 |
| Molecular weight (number average) | 2400 | 2400 |
| Initiator | | |
| Initiator | benzoylperoxide | dicumyl peroxide |
| Parts/100 Parts Backbone Polymer | 4 | 10 |
| Graft Polymer | | |
| Allyl glycidyl ether (parts) | 25 | 25 |
| Weight percent epoxy | 0.8 | 3.4 |
| Molecular weight (number average) | 2290 | 1970 |
| Epoxy/chain | 0.4 | 2.3 |
| Brookfield Viscosity @ 24° (centipoise/1000) | 265 | 720 |
| Cured Properties | | |
| Recipe | (g) | (f) |
| Gel time @ 51° C. (min.) | 275 | 10 |
| Shore A | 1 | 7 |
| Percent Elongation at Break | 200 | 50–100 |
| Days Cure @ Temp. | 3/53° C. | 0.7/53° C. |

The above results indicate the usefulness of the epoxy-grafted EPDM polymers of this invention in telecommunication cable encapsulation compositions.

EXAMPLES 12 AND 13

Certain homopolymers within the scope of this invention were epoxidized, following generally the procedure of Example 1. Analyses and results are summarized in Table IV.

TABLE IV
EPOXY-GRAFTED POLYALPHAOLEFINS

| Example | 12 | 13 |
|---|---|---|
| Polymer | Polypropylene[1] | Polydecene-1[2] |
| Molecular weight (number average) | ca. 800 | 2000 |
| Graft Polymer | | |
| Weight percent epoxy | 5.9 | 3.7 |
| Molecular weight (number average) | 830 | —[3] |
| Epoxy/chain | 1.1 | ca. 1.7 |
| Brookfield Viscosity @ 25° C. | 33,300 | —[3] |
| Recipe | (a) | (b) |
| Gel time @ 53° C., min. | 13 | (4) |

Remarks:
[1]Amorphous atactic polypropylene; prepared with (C₂H₅)₂ZrCl₂ catalyst/methaluminoxane cocatalyst.
[2]Polydecene; bulk viscosity at 100° C. = 100 cst.
[3]"—" indicates not measured
[4]Cured within 24 hours at room temperature.

Good results are achieved when the above polymers are employed in encapsulation compositions for telecommunication cable segments.

EXAMPLES 14–17

Several ethylene/propylene copolymers were modified by grafting onto them allyl glycidyl ether by a process essentially identical to that described in Example 1. Two of these copolymers (Examples 14 and 15) were prepared using a VOCl₃-based Ziegler-Natta catalyst system and two (Examples 16 and 17) were made employing a zirconium catalyst/methaluminoxane cocatalyst system. The resultant polymers were analyzed, which analyses are summarized in Table V below. The backbone polymers of Examples 14 and 15 do not exhibit vinylidene-type unsaturation whereas analysis reveals that a major percentage of the backbone polymer chains of Examples 16 and 17 possess vinylidene unsaturation.

TABLE V

| Example | 14 | 15 | 16 | 17 |
|---|---|---|---|---|
| VOCl₃-catalyzed | yes | yes | — | — |
| Zr-catalyzed | — | — | yes | yes |
| Molecular weight, initial | 2500 | 2500 | 2200 | 2500 |
| Molecular weight, after grafting | 2340 | 2760 | 2460 | 2820 |
| No. epoxy groups/Chain | 2.2 | 2.4 | 2.1 | 3.0 |
| Brookfield viscosity (25° C.)* | 178,000 | 126,000 | 33,000 | 112,000 |

*Determined employing Brookfield [trademark] type HBT viscometer with microcell; Spindle #21.

The above data clearly indicate the lower bulk viscosities observed for epoxy-grafted ethylene/propylene copolymers having vinylidene unsaturation relative to similar grafted copolymers produced from copolymers not having vinylidene-type unsaturation.

EXAMPLES 18 AND 19

Additional low molecular weight ethylene/propylene copolymers were prepared employing (in Example 18) a catalyst composition comprising (C₅H₅)₂ZrCl₂ and (in Example 19) a catalyst composition comprising VOCl₃. The zirconium-catalyzed copolymers exhibited vinylidene unsaturation whereas the vanadium-catalyzed copolymers did not exhibit vinylidene-type unsaturation. These copolymers were grafted with allyl glycidyl ether by reacting such copolymers and ethers with dicumyl peroxide. The physical properties of the graft copolymers are shown in Table VI.

These graft copolymers were formulated (as described in Table VI) into encapsulation compositions. The initial Brookfield viscosities of such compositions and the gel times (i.e., the minutes until a viscosity of 10⁵ centipoise was measured) were determined. In addition, the adhesion of said encapsulation compositions to a length of polyethylene insulated copper wire coated with a hydrocarbon grease type cable filling compound was measured by inserting a length of said wire into a 5 inch test tube; pouring in the encapsulation composition to be tested until it filled 4.5 inches of such test tube; allowing the encapsulation composition to cure; and measuring the force required (in pounds) to withdraw the 4.5 inch length of wire. The results of said testing are summarized in Table VI.

TABLE VI

| Example | 18 | 19 |
|---|---|---|
| Backbone Polymer | | |
| Catalyst | (C₅H₅)₂ZrCl₂ | VOCl₃ |
| Molecular Weight (number average) | 2,500 | 2,500 |
| Graft Copolymer | | |
| Molecular Weight (number average) | 2,770 | 3,020 |
| Weight Percent Epoxy Groups | 4.7 | 4.8 |
| Brookfield Viscosity (at 25° C.) | 138,000 | 350,000 |
| Formulation Components[1] | | |
| EPIREZ 5018 (TM)[2] | 65 | 65 |
| Nonylphenol | 50 | 50 |
| Triethylene tetramine | 8 | 8 |
| Formulation | | |
| Initial Brookfield Viscosity (at 25° C.) | 1640 | 3600 |
| Gel Time (min.) | 371 | 65 |
| Adhesion to Wire | 4.8 | 2.9 |

[1]In parts by weight per hundred parts graft polymer
[2]monoglycidyl ether of C₁₂-C₁₄ aliphatic alcohols available from Celanese.

The above data further indicate the utility of the compositions of this invention in telecommunication cable encapsulation compositions.

EXAMPLE 20 AND COMPARATIVE EXPERIMENT A

An ethylene/propylene copolymer (Example 20) produced employing a (C₅H₅)₂ZrCl₂/methaluminoxane catalyst system, was grafted with allyl glycidyl ether employing di-t-butyl peroxide as a free radical initiator. The graft polymers so produced comprised 4.5 weight percent epoxy groups, possessed a number average molecular weight of 1960, had an average epoxy-functionality of 2.1 groups/chain, and possessed a Brookfield viscosity of 31,100 centipoise at 25° C.

The graft polymers so produced were formulated into an encapsulation composition employing recipe (d) described above. The composition so formed was tested for its moisture resistance, compatibility with cable filler and adhesion to conductor wire.

The moisture resistance of the cured composition was determined by boiling a sample of the cured composition in water for one week, and noting the percent change in hardness.

The compatibility of the encapsulant was measured employing the following two tests: (A) Cured Absorption—a cured sample of the encapsulant (measuring 1 inch × 1 inch × 0.25 inch) was placed on top of Flex-gel TM, a hydrocarbon grease-type cable filler, and aged for 7 days at 60° C. The sample was weighted before and after aging and the precent weight change measured; (B) Curing Absorption: 15 grams of freshly mixed encapsulant poured on top of Flexgel TM cable filler and cured for 1 week at room temperature. At the end of the test, the encapsulant was peeled off the cable filler interface. The appearance of the interface and the percent weight change of the encapsulation composition was determined.

The adhesion of the encapsulation composition to conductor wire was determined as follows: conductor wire coated with Flexgel TM, a hydrocarbon grease-type cable filler, was placed in a 5-inch test tube filled to the 4.5 inch level with encapsulant. The sample was cured 4 days at room temperature. After conditioning 1 hour at 60° C., the force required to pull out the wire was recorded. The results of such testing are summarized in Table VII.

As a comparison (Comparative Experiment A), an identical series of tests were performed employing a urethane based encapsulant, known as D Encapsulant. D Encapsulant is currently used for filling telecommunication cable segments. The results of such testing are also summarized in Table VII.

TABLE IV

URETHANE VS EPOXIDIZED ETHYLENE/PROPYLENE ENCAPSULANTS

| Example of Comparative Experiment | A | 20 |
|---|---|---|
| Backbone Polymer | Polyurethane | Ethylene/Propylene Copolymer |
| Moisture Resistance - | | |
| Percent Change Hardness After One Week/Boiling Water | −20 | 0 |
| Compatibility With Cable Filler | | |
| 60° C./7 day Absorption - Cured Percent Weight Change | −5.5 | +21.6 |
| Curing Absorption - 7-day Room Temperature Percent Weight Change | −2.5 | +3.1 |
| Appearance of Interface | Oily | Dry |
| Adhesion to Conductor Wire | | |
| 60° C. Wire Pull-out (lb./4.5" Wire Length) | 0.8 | 3.1 |

The above data indicates the superiority of the compositions of this invention as splice encapsulants relative to the urethane based encapsulation composition.

EXAMPLES 21-23 AND COMPARATIVE EXPERIMENTS B-E

In order to show the amorphousness of the polymers employed as backbones in the graft polymer of the compositions of this invention relative to the crystallinity of low molecular weight polyethylene waxes, the melting transition spectra of several samples of low molecular weight polyethylene wax and of low molecular weight dicyclopentadienyl zirconium dichloride/methaluminoxane catalyzed ethylene/propylene copolymers ("EP") were evaluated employing a Perkin Elmer Differential Scanning Calorimeter Model 2C. The purge gas employed was Helium, the sample size was 10-20 miligrams, and the scan was conducted at a rate of 20 degrees/minute. The results of such testing are summarized in Table VIII below. It is to be noted that these curves would not be materially altered by the grafting of epoxy-functionalized compounds to the extent contemplated by the present invention.

TABLE VIII

Differential Scanning Calorimetry Comparison

| Example Comparative Experiment | Polymer | Weight Percent Ethylene | Molecular Weight | Differential Scanning Calorimetry Peak (°C.) | | |
|---|---|---|---|---|---|---|
| | | | | From | To | Maximum |
| B | Poly-ethylene* | 100 | 500 | 32 | 102 | 87 |
| C | Poly-ethylene* | 100 | 1000 | 67 | 127 | 117 |
| D | Poly-ethylene** | 100 | 900 | 34 | 102 | 60 |
| E | Poly-ethylene*** | 100 | 1800 | 27 | 117 | 98 |
| 21 | EP | 55 | 1470 | −58 | 27 | −30 |
| 22 | EP | 59 | 7100 | −34 | 35 | −3 |
| 23 | EP | 40 | 5700 | −52 | 37 | −20 |

*Polywax 500 and 1000, available from Petrolight
**Epolyn N14P, available from Eastman Chemical Products, Inc.
***Available from Boler Petroleum Co.

The above-identified data clearly indicate that the polymers employed in the composition of this invention are amorphous at room temperature when compared with prior art polymers produced by the grafting of low molecular weight polyethylene waxes.

What is claimed is:

1. A method of encapsulating a telecommunication cable segment comprising the steps:

(A) placing a telecommunication cable segment within a closure;

(B) forming an encapsulation composition by mixing:

(1) a liquid graft polymer having a Brookfield viscosity of less than about 1,000,000 centipoise at 25° C., said graft polymer either possessing no melting transition peak or a melting transition peak having a maximum value below 25° C. as measured by Differential Scanning Calorimetry; said graft polymer being comprised of: a polymeric backbone selected from the group consisting of polyalphaolefin, ethylene/alphaolefin copolymer, ethylene/alphaolefin/nonconjugated polyene terpolymer, polyisoprene, polybutadiene, and a alphaolefin/polyene copolymers;

said polymeric backbone having grafted thereto a sufficient amount of at least one compound selected from the formulae:

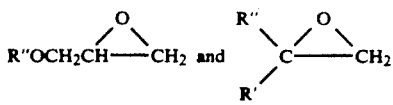

wherein R" is a $C_2-C_{16}$ hydrocarbon radical containing an ethylenically unsaturated bond or a $C_3-C_{12}$ radical containing one or more carbonyl groups and an ethylenically unsaturated double bond; and R' is hydrogen or $C_1-C_4$ alkyl;

such that said graft polymer is rendered crosslinkable;

said graft polymer having a number average molecular weight of between about 500 and about 20,000; with (2) a sufficient amount of a suitable curative to cure the composition;

(C) pouring a sufficient amount of said encapsulation composition into the closure such that the portion of said cable segment to be embedded is covered with said encapsulation composition; and (D) subjecting said encapsulation composition to conditions sufficient to cure the composition.

2. The method of claim 1 wherein said graft polymer has a polymeric backbone selected from the group consisting of ethylene/alphaolefin copolymer, polyalphaolefin and ethylene/alphaolefine/nonconjugated polyene terpolymer.

3. The method of claim 2 wherein said graft polymer has a polymeric backbone selected from the group consisting of ethylene/propylene copolymer and ethylene/propylene/nonconjugated diene terpolymer.

4. The method of claim 3 wherein R" is a $C_2$-$C_{12}$ hydrocarbon radical containing an ethylenically unsaturated bond or is an acrylate or a methacrylate radical.

5. The method of claim 2 wherein said polymeric backbone has grafted thereto allyl glycidyl ether.

6. The method of claim 2 wherein said graft copolymer has a number average molecular weight of between about 1,000 and about 4,500.

7. The method of claim 1 wherein said graft polymer has a number average molecular weight of between about 750 and about 10,000.

8. The method of claim 1 wherein said graft polymer has a Brookfield viscosity of less than about 500,000 centipoise at 25° C.

9. The method of claim 1 wherein the curing conditions in step (D) comprise ambient pressure and temperature.

* * * * *